Patented Oct. 4, 1927.

1,644,419

UNITED STATES PATENT OFFICE.

JOSEPH G. DAVIDSON, OF YONKERS, NEW YORK, ASSIGNOR TO CARBIDE AND CARBON CHEMICALS CORPORATION, A CORPORATION OF NEW YORK.

SOLUTION OF CELLULOSE ESTERS.

No Drawing.   Application filed August 5, 1925. Serial No. 48,413.

This invention relates to solutions of cellulose esters, and more particularly to such solutions intended for use as lacquers, varnishes, and the like.

The primary object of this invention is to provide an improved solvent for cellulose esters.

I have discovered that the methyl ethers of glycols are very efficient solvents for cellulose esters, and are especially adapted for the preparation of lacquers and the like.

These ethers may be prepared by any suitable method. For example, in application Serial No. 691,283, filed by Charles O. Young, on February 7, 1924, there is disclosed a method of making monoalkyl ethers of glycols. This method consists essentially in heating ethylene oxide with an alcohol under pressure for a suitable period of time to cause the formation of a mono-ether of ethylene glycol. The reaction products may then be distilled fractionally to obtain the ether. The reaction may be expressed as follows, when methyl alcohol is used and the monomethyl ether of ethylene glycol produced:

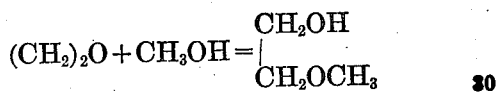

Alternative methods of preparing monoalkyl ethers of glycols are disclosed in my applications bearing Serial No. 691,297, filed on February 7, 1924, and Serial No. 759,208, filed on December 31, 1924. Briefly, these methods consist in refluxing ethylene glycol or ethylene chlorhydrin with suitable quantities of caustic soda and methyl sulphate for a suitable period of time. The reaction products are then distilled under vacuum, and the resulting distillate is redistilled under atmospheric pressure to obtain the final product. The equations for the above reaction are as follows:

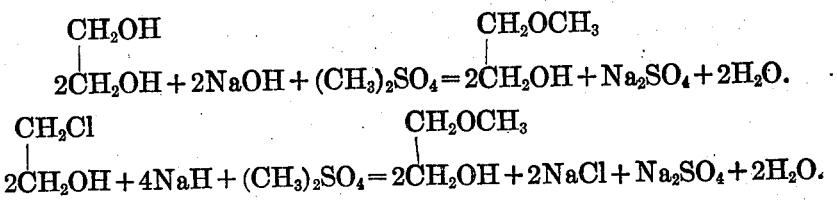

The dimethyl ether of ethylene glycol is also a good solvent for cellulose esters. It may be formed by either of the following reactions:

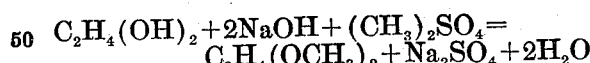

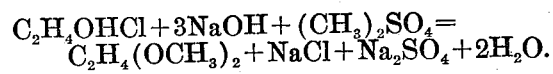

The monomethyl ether of ethylene glycol is a particularly good solvent for cellulose acetate. It is important to note that it is not necessary to use an auxiliary solvent with this ether when dissolving cellulose acetate. This is of course an advantageous feature.

As an illustration of the relatively high solvent effect of the said mono-ether, the following may be noted:

It only required 4 c. c. of monomethyl ether of ethylene glycol to dissolve one gram of commercial cellulose acetate. A comparative test showed that a solution of cellulose acetate made up with the monomethyl ether may be diluted with a non-solvent, such as toluene, to a greater extent than a solution made with any of the usual solvents. A solution of two grams of cellulose acetate in 20 c. c. of monomethyl ether of ethylene glycol was made, and then diluted with toluene until precipitation occurred. The aforesaid solution required 25 c. c. of toluene to cause precipitation. When glycol diacetate was used for dissolving the cellulose acetate only 15 c. c. of toluene were required to produce precipitation, while in two other tests, one on a solution made up with a mixture of ethylene dichloride and ethyl alcohol in equal proportions, and the other on a solution made up with a mixture of methyl alcohol and acetylene tetrachloride, only 10 c. c. of toluene were necessary to cause precipitation. However, the monomethyl or dimethyl ethers of ethylene glycol will usually by used in conjunction with diluents or auxiliary solvents, these latter materials being added for the purpose of economy or for the attainment of special characteristics in the modified solvent. Of course, it is essential that the added material blend or be miscible with the ether and the ester without causing a precipitation of the said ester from solution.

This application is a continuation in part of my application Serial No. 719,891, filed on June 13, 1924.

I claim:

1. A composition of matter comprising a methyl ether of ethylene glycol and a dissolved cellulose ester.

2. A composition of matter comprising a methyl ether of ethylene glycol and dissolved cellulose acetate.

3. A composition of matter comprising monomethyl ether of ethylene glycol and a dissolved cellulose ester.

4. A composition of matter comprising monomethyl ether of ethylene glycol and dissolved cellulose acetate.

5. A composition of matter comprising a dissolved cellulose ester, a methyl ether of ethylene glycol, and a liquid adapted to blend with the solution.

6. A composition of matter comprising a dissolved cellulose ester; a methyl ether of ethylene glycol, and a hydrocarbon adapted to blend with the solution.

7. A composition of matter comprising cellulose acetate, monomethyl ether of ethylene glycol, and an aromatic hydrocarbon.

8. A composition of matter comprising cellulose acetate, monomethyl ether of ethylene glycol, and toluene.

9. A solvent for cellulose esters comprising a methyl ether of ethylene glycol.

10. A solvent for cellulose acetate comprising monomethyl ether of ethylene glycol.

11. A solvent for cellulose acetate comprising monomethyl ether of ethylene glycol and a liquid miscible therewith.

12. A solvent for cellulose acetate comprising monomethyl ether of ethylene glycol and toluene.

In testimony whereof, I affix my signature.

JOSEPH G. DAVIDSON